United States Patent
Kim et al.

(10) Patent No.: US 10,320,473 B2
(45) Date of Patent: Jun. 11, 2019

(54) METHOD FOR RECEIVING DATA FOR EACH SERVICE FROM PARTICULAR FRAME IN WIRELESS COMMUNICATION SYSTEM AND APPARATUS FOR THE METHOD

(71) Applicant: LG ELECTRONICS INC., Seoul (KR)

(72) Inventors: Jinmin Kim, Seoul (KR); Jaehoon Chung, Seoul (KR); Genebeck Hahn, Seoul (KR); Eunjong Lee, Seoul (KR); Kukheon Choi, Seoul (KR); Kwangseok Noh, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 15/523,930

(22) PCT Filed: Mar. 16, 2015

(86) PCT No.: PCT/KR2015/002514
§ 371 (c)(1),
(2) Date: May 2, 2017

(87) PCT Pub. No.: WO2016/072570
PCT Pub. Date: May 12, 2016

(65) Prior Publication Data
US 2017/0331547 A1 Nov. 16, 2017

Related U.S. Application Data

(60) Provisional application No. 62/074,657, filed on Nov. 4, 2014.

(51) Int. Cl.
H04B 7/26 (2006.01)
H04L 5/00 (2006.01)
H04W 72/12 (2009.01)

(52) U.S. Cl.
CPC ............. *H04B 7/26* (2013.01); *H04L 5/00* (2013.01); *H04L 5/0012* (2013.01);
(Continued)

(58) Field of Classification Search
CPC ....... H04L 5/0005; H04L 5/0016; H04L 5/06; H03H 7/46; H04Q 5/12; H04Q 9/12
See application file for complete search history.

(56) References Cited

U.S. PATENT DOCUMENTS 9,585,103 B2 * 2/2017 Chen ................. H04W 52/18
10,027,462 B2 * 7/2018 Jiang ................. H04L 5/0092
(Continued)

FOREIGN PATENT DOCUMENTS

KR   1020080002901   1/2008

OTHER PUBLICATIONS

PCT International Application No. PCT/KR2015/002514, Written Opinion of the International Searching Authority dated Jun. 29, 2015, 15 pages.
(Continued)

*Primary Examiner* — Sharad Rampuria
(74) *Attorney, Agent, or Firm* — Lee Hong Degerman Kang & Waimey

(57) ABSTRACT

The method for a terminal for receiving data for each service from a particular frame in a wireless communication system according to the present invention comprises the steps of: receiving, from a base station, a first control channel comprising first control information associated with a first service; receiving, from the base station and on the basis of the control information, a first data channel utilized for trans-
(Continued)

mitting the first service; receiving, from the base station, a second control channel comprising second control information associated with a second service; and receiving, from the base station and on the basis of the second control information, a second data channel utilized for transmitting the second service, wherein the first and second services are services of mutually different types, and the first control channel is received by means of the full system bandwidth configured on the terminal, and the second control channel and second data channel are received by means of a particular sub-band within the full system bandwidth.

10 Claims, 10 Drawing Sheets

(52) U.S. Cl.
CPC .......... *H04L 5/0064* (2013.01); *H04L 5/0082* (2013.01); *H04L 5/0091* (2013.01); *H04W 72/1289* (2013.01); *H04L 5/0023* (2013.01)

(56) References Cited

U.S. PATENT DOCUMENTS

| | | | |
|---|---|---|---|
| 2008/0013599 A1* | 1/2008 | Malladi | H04L 5/0007 375/132 |
| 2009/0046606 A1 | 2/2009 | Wan et al. | |
| 2012/0099549 A1 | 4/2012 | Imamura et al. | |
| 2013/0250790 A1* | 9/2013 | Lin | H04W 72/085 370/252 |
| 2015/0215874 A1* | 7/2015 | Chen | H04W 52/18 455/522 |

OTHER PUBLICATIONS

Ericsson, "On Multi-Subframe and Cross-Subframe Scheduling", 3GPP TSG RAN WG1 Meeting #73, R1-132145, May 2013, 2 pages.

* cited by examiner

METHOD FOR RECEIVING DATA FOR EACH SERVICE FROM PARTICULAR FRAME IN WIRELESS COMMUNICATION SYSTEM AND APPARATUS FOR THE METHOD

CROSS-REFERENCE TO RELATED APPLICATIONS

This application is the National Stage filing under 35 U.S.C. 371 of International Application No. PCT/KR2015/002514, filed on Mar. 16, 2015, which claims the benefit of U.S. Provisional Application No. 62/074,657, filed on Nov. 4, 2014, the contents of which are hereby incorporated by reference herein in its entirety.

TECHNICAL FIELD

The present invention relates to a wireless access system, and more particularly, to a method for receiving data for each service from a particular frame in a wireless communication system and an apparatus for the same.

BACKGROUND ART

A 3GPP LTE (3rd Generation Partnership Project Long Term Evolution) system has been designed in a frame structure having a transmission time interval (TTI) of 1 ms, and its data request latency time for a video application is 10 ms. However, the future 5G technology requires data transmission of lower latency due to the advent of a new application such as real-time control and tactile internet, and it is expected that 5G data request latency will be lowered to reach 1 ms.

However, the frame structure having a TTI of 1 ms according to the related art has a problem in that data request latency of 1 ms cannot be fulfilled. 5G aims to provide data latency reduced as much as about 10 times as compared with the related art. In order to solve the problem, a 5G communication system requires a new frame structure having a TTI shorter than that of the related art. However, a frame structure in a 5G communication system, which can provide reduced data latency, has not been suggested up to now.

DISCLOSURE

Technical Problem

An object of the present invention is to provide a method for receiving data for each service in a user equipment (UE) from a particular frame in a wireless communication system.

Another object of the present invention is to provide a UE for receiving data for each service from a particular frame in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve the object of the present invention, a method for receiving data for each service in a specific frame by a user equipment (UE) in a wireless communication system comprises the steps of receiving, from a base station, a first control channel comprising first control information associated with a first service; receiving, from the base station, a first data channel used for transmission of the first service based on the first control information; receiving, from the base station, a second control channel comprising second control information associated with a second service; and receiving, from the base station based on the second control information, a second data channel used for transmission of the second service, wherein the first and second services are different types of services, and the first control channel is received on a total system bandwidth configured for the UE, and the second control channel and second data channel are received through a specific subband of the total system bandwidth. A transmission time duration including the second control channel and the second data channel associated with the second service corresponds to a predetermined number of symbol durations, and the specific frame may include a plurality of transmission time durations. The second control channel may occupy one symbol duration for the transmission time duration, and the second data channel may occupy two symbol durations for the transmission time duration. If the second data channel is received on a subband which includes resource blocks greater than 6 resource blocks, the second control channel may be received in the form of frequency hopping per transmission time duration in the specific frame.

The method may further comprise receiving a value associated with a form of the frequency hopping of the second control channel per transmission time duration, from the base station through a higher layer signaling. The method may further comprise receiving information on a starting point of the second data channel for the transmission time duration from the base station when the second data channel is received on a subband, which includes resource block greater than that of the second control channel, in the transmission time duration of the specific frame. A starting point of the second data channel may be a first symbol at the transmission time duration. The method may further comprise receiving an indicator indicating that a frame structure for transmission of the second service is to be used or enabled from the base station through a higher layer signaling. The second service may be a service that requires low latency, and the first service may be the other service except the service that requires low latency. The second control channel may be received on a subband that includes 6 resource blocks, and the second data channel may be received on a subband that includes resource blocks more than 6.

To achieve the other object of the present invention, a user equipment (UE) for receiving data for each service in a specific frame in a wireless communication system comprises a receiver; and a processor, wherein the processor is configured to control the receiver receives, from a base station, a first control channel comprising first control information associated with a first service, receives, from the base station, a first data channel used for transmission of the first service based on the first control information, receives, from the base station, a second control channel comprising second control information associated with a second service, and receives, from the base station, a second data channel used for transmission of the second service based on the second control information, and wherein the first and second services are different types of services, and the first control channel is received on a total system bandwidth configured for the UE, and the second control channel and second data channel are received through a specific subband of the total system bandwidth. A transmission time duration including the second control channel and the second data channel associated with the second service corresponds to a predetermined number of symbol durations, and the specific frame may include a plurality of transmission time durations.

The second control channel may occupy one symbol duration for the transmission time duration, and the second data channel may occupy two symbol durations for the transmission time duration. If the second data channel is received on a subband which includes resource blocks greater than 6 resource blocks, the processor controls the receiver to receive the second control channel in the form of frequency hopping per transmission time duration in the specific frame. The processor is further configured to control the receiver to receive a value associated with frequency hopping of the second control channel per transmission time duration, from the base station through a higher layer signaling. The processor is configured to control the receiver to receive information on a starting point of the second data channel for the transmission time duration from the base station when the second data channel is received on a subband, which includes resource blocks greater than that of the second control channel, in the transmission time duration of the specific frame. A starting point of the second data channel may be a first symbol at the transmission time duration.

The processor may control the receiver to receive an indicator indicating that a frame structure for transmission of the second service is to be used or enabled from the base station through a higher layer signaling. The second service may be a service that requires low latency, and the first service may be the other service except the service that requires low latency. The second control channel may be received on a subband that includes 6 resource blocks, and the second data channel may be received on a subband that includes resource blocks more than 6 resource blocks.

Advantageous Effects

To minimize data reception latency of a UE in a 5G communication system in accordance with a new frame structure suggested in the present invention, an influence of a legacy UE can be minimized, whereby communication throughput can be improved significantly.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Figure 1:
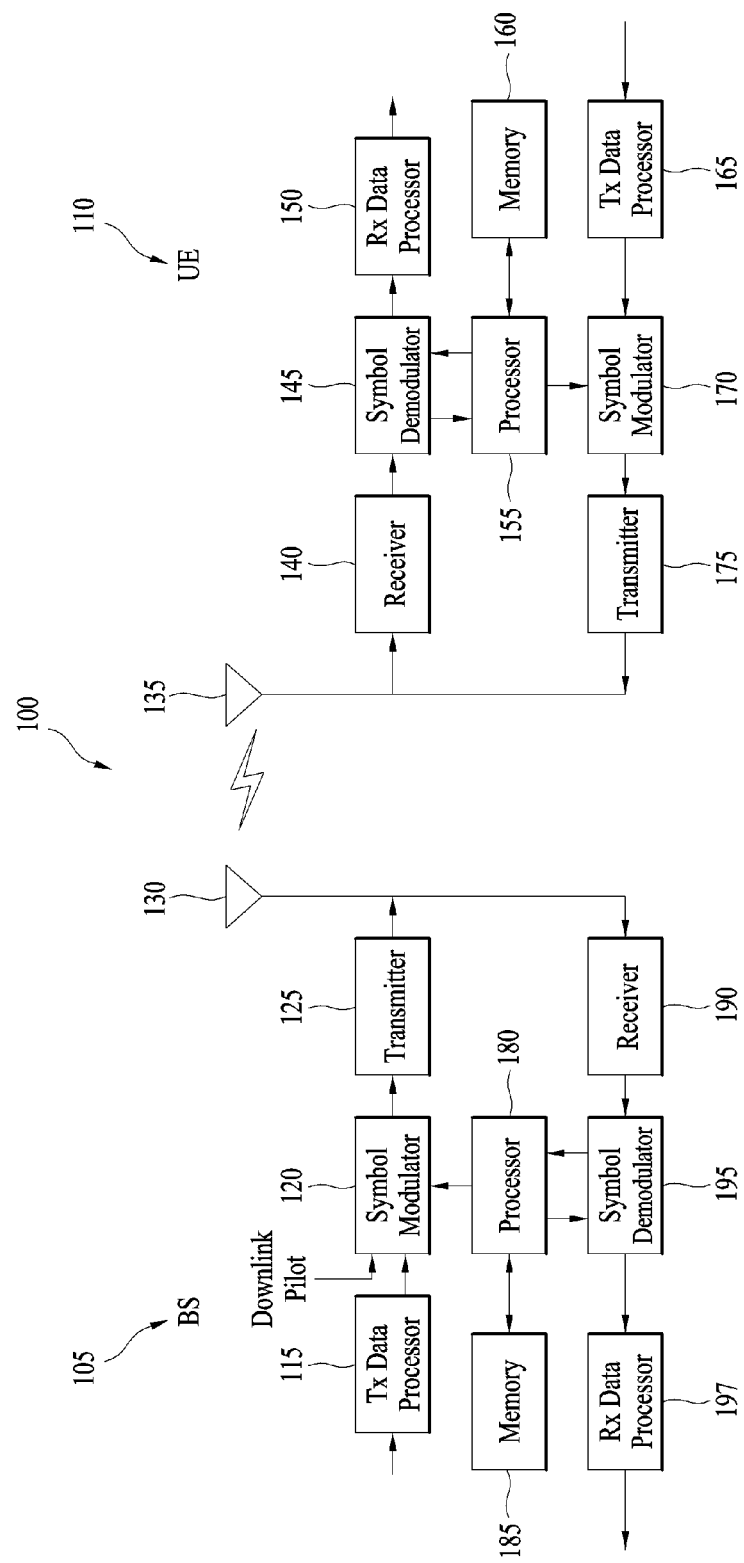
FIG. 1 is a block diagram illustrating a configuration of a base station 105 and a UE 110 in a wireless communication system.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
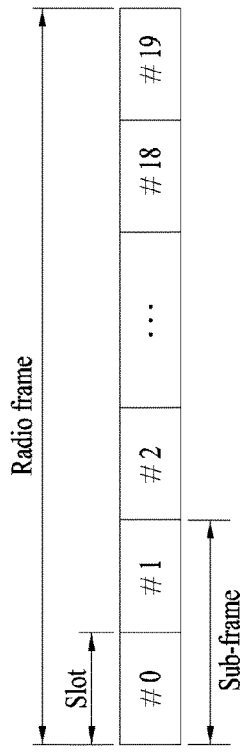
FIGS. 2 and 3 respectively illustrate structures of FDD and TDD radio frames used in a 3GPP LTE/LTE-A system which is an example of a wireless communication system.
Figure 3:
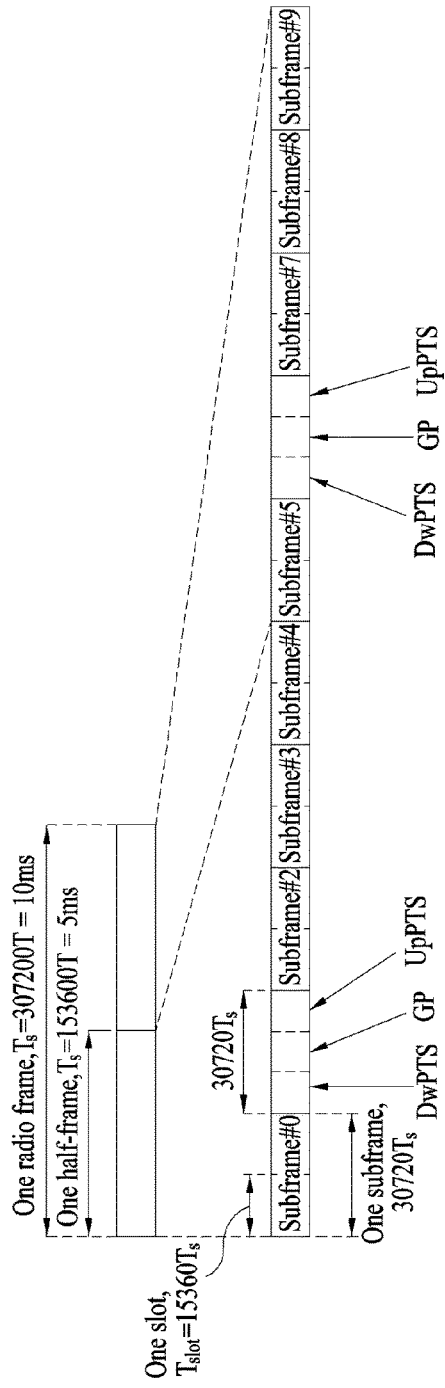

FIGS. 2 and 3 respectively illustrate structures of FDD and TDD radio frames used in a 3GPP LTE/LTE-A system which is an example of a wireless communication system.

In respect of wireless transmission between a base station and a wireless UE, transmission from the base station to the wireless UE will be referred to as downlink transmission, and transmission from the wireless UE to the base station will be referred to as uplink transmission. A mode for identifying radio resources between the downlink transmission and the uplink transmission will be defined as a 'duplex' mode, wherein a case that a frequency band is divided into a downlink transmission band and an uplink transmission band to perform bidirectional transmission and reception will be referred to as frequency division duplex (FDD), and a case that time domain radio resources are divided into downlink time duration resources and uplink time duration resources in the same frequency band to perform transmission and reception will be referred to as time division duplex (TDD). Physical radio frame structures of LTE FDD and TDD as main OFDM transmission systems are respectively shown in FIGS. 2 and 3.

In an Orthogonal Frequency Division Multiplexing (OFDM) wireless communication system, uplink/downlink data transmission is performed in a unit of subframe. One subframe is defined as a predetermined time duration including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 2 illustrates the type-1 radio frame structure. A radio frame includes 10 subframes, each of which includes two slots in a time domain. A unit time during which one subframe is transmitted is defined as a Transmission Time Interval (TTI). For example, a length of one subframe may be 1 ms, and a length of one slot may be 0.5 ms. A slot includes a plurality of OFDM symbols in the time domain and a plurality of Resource Blocks (RBs) in the frequency domain. Since the 3GPP LTE system adopts OFDMA symbols for downlink, OFDM symbols represent one symbol duration. OFDM symbols may be referred to as SC-FDMA symbols or symbol duration. A resource block (RB) is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus, when the extended CP is used, for example, 6 OFDM symbols may be included in one slot. If a channel state gets unstable, for example, during fast movement of a UE, the extended CP may be used to further decrease Inter-Symbol Interference. In the case of the normal CP, one subframe includes 14 OFDM symbols because one slot includes 7 OFDM symbols. At this time, the first two or three OFDM symbols of each subframe may be allocated to a Physical Downlink Control CHannel (PDCCH) and the other OFDM symbols may be allocated to a Physical Downlink Shared Channel (PDSCH).

FIG. 3 illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe includes two slots. The DwPTS is used for initial cell search, synchronization, or channel estimation at a UE. The UpPTS is used for channel estimation and acquisition of uplink transmission synchronization to a UE at a base station. The GP is a period between an uplink and a downlink, which eliminates uplink interference caused by multipath delay of a downlink signal.

Each half frame includes 5 subrames, in which 'D' represents a subframe for downlink transmission, 'U' represents a subframe for uplink transmission, and 'S' represents a special subframe that includes three fields such as the DwPTS, the GP, and the UpPTS. The DwPTS is used for initial cell search, synchronization, or channel estimation at a UE. The UpPTS is used for channel estimation and acquisition of uplink transmission synchronization to a UE at a base station. The GP is a period between an uplink and a downlink, which eliminates uplink interference caused by multipath delay of a downlink signal.

In case of a downlink-uplink switching-point period of 5 ms, the special subframe S is present for each half-frame, and in case of a downlink-uplink switching-point of 5 ms, the special subframe S is present only for a first half-frame. Subframe indexes #0 and #5 and the DwPTS are intervals for only the downlink transmission. The UpPTS and a subframe just subsequent to the special subframe are always intervals for the uplink transmission. If multiple cells are aggregated, the UE may assume the same uplink-downlink configuration over all cells, and the guard period of the special subfame at different cells is overlapped for at least 1456 Ts. The structure of the radio frame is only exemplary and the number of subcarriers included in the radio frame or the number of slots included in the subframe and the number of OFDM symbols included in the slot may be variously changed.

Figure 4:
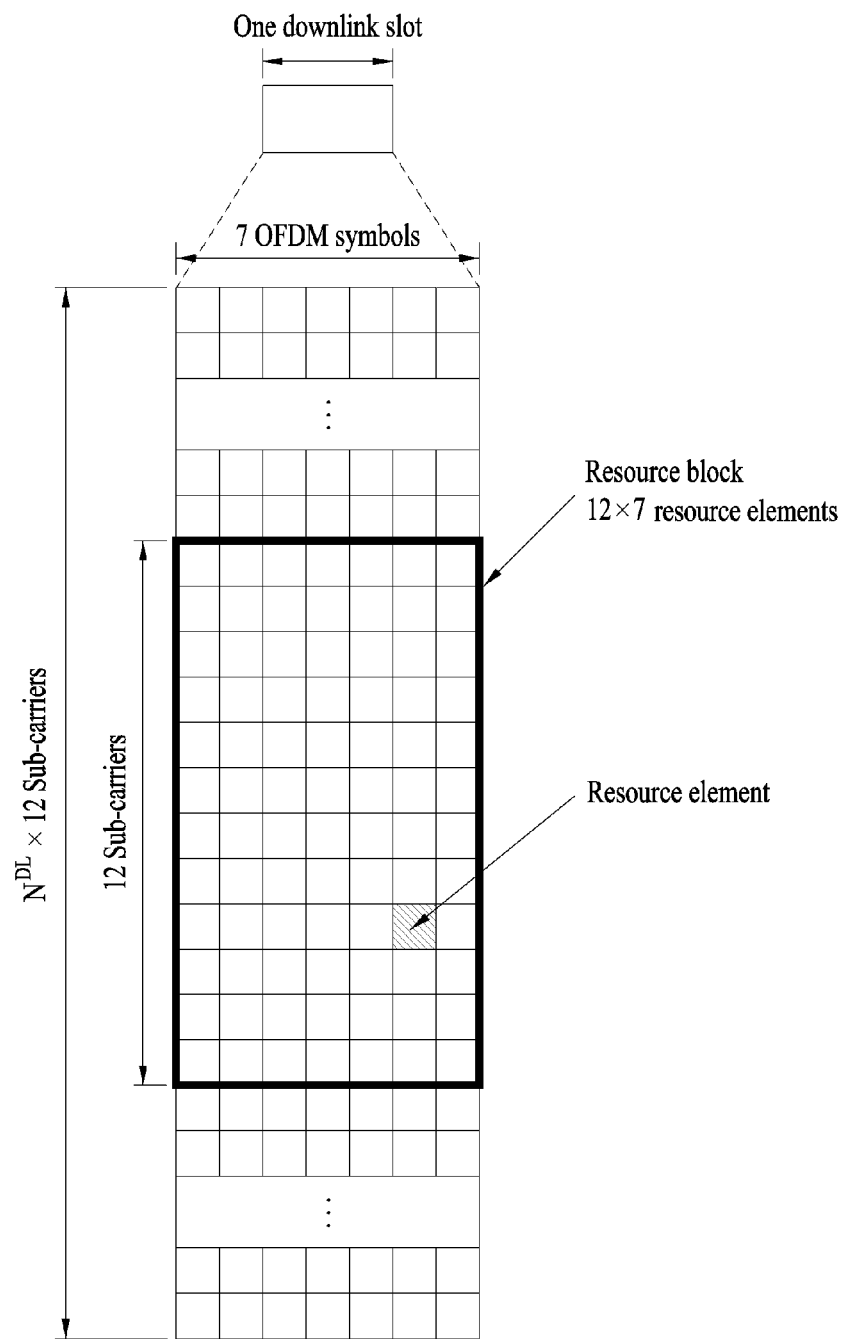
FIG. 4 illustrates a resource grid of a downlink subframe of a 3GPP LTE/LTE-A system which is an example of a wireless communication system.

FIG. 4 is a diagram illustrating a resource grid of a downlink slot in a 3GPP LTE/LTE-A system which is an example of a wireless communication system.

Referring to FIG. 4, a downlink slot includes a plurality of OFDM symbols in a time domain. One downlink slot may include 7 (or 6) OFDM symbols in the time domain and an RB may include 12 subcarriers in the frequency domain. Each element on the resource grid is referred to as a resource element (RE). One RB includes 12×7(6) REs. The number NRB of RBs in a downlink slot depends on a downlink transmission bandwidth. An uplink slot has the same structure as that of a downlink slot, and in this case, OFDM symbols are replaced with SC-FDMA symbols.

The 3GPP LTE defines a sub-band as a group of RBs ($N_{RB}^{sb}$), and a size of the sub-band may be obtained through the following Equation 1. In this case, the number $N_{sb}$ of sub-bands and hopping-mode related parameters are provided by a higher layer.

$$N_{RB}^{sb} = \begin{cases} N_{RB}^{UL} & N_{sb} = 1 \\ \lfloor N_{RB}^{UL} - N_{RB}^{HO} - N_{RB}^{HO} \bmod 2 \rfloor / N_{sb} & N_{sb} > 1 \end{cases} \quad \text{[Equation 1]}$$

Figure 5:
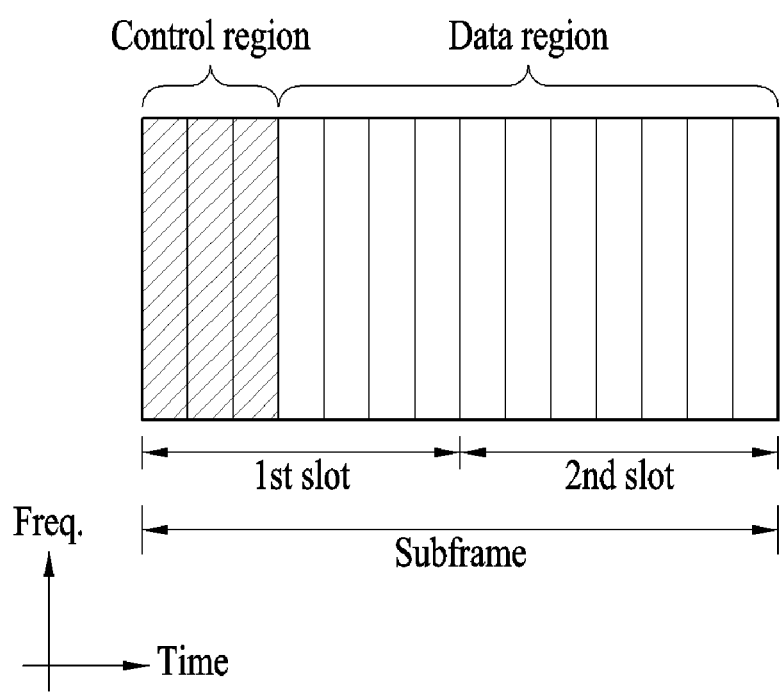
FIG. 5 illustrates a structure of a downlink subframe of a 3GPP LTE/LTE-A system which is an example of a wireless communication system.

FIG. 5 illustrates a structure of a downlink subframe of a 3GPP LTE/LTE-A system which is an example of a wireless communication system.

Referring to FIG. 5, maximum three (four) OFDM symbols at the start of the first slot in a subframe correspond to a control region to which control channels are allocated. The other OFDM symbols correspond to a data region to which a PDSCH is allocated. Downlink control channels used in the LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is transmitted from the first OFDM symbol of the subframe, and carries information on the number (for example, 1, 2 or 3) of OFDM symbols used for transmission of control channels (PDCCH) in the subframe. The PHICH carries an HARQ ACKnowledgment/Negative ACKnowledgment (ACK/NACK) signal in response to uplink transmission.

Control information transmitted through the PDCCH is called Downlink Control Information (DCI). In a DCI format, format 0 is defined for an uplink and formats 1, 1A, 1B, 1C, 1D, 2, 2A, 3 and 3A are defined for a downlink. The DCI format selectively includes hopping flag, RB allocation, modulation coding scheme (MCS), redundancy version (RV), new data indicator (NDI), transmit power control (TPC), cyclic shift demodulation reference signal (DM RS), channel quality information (CQI) request, HARQ process number, transmitted precoding matrix indicator (TPMI), precoding matrix indicator (PMI) confirmation, etc.

The PDCCH carries transmission format and resource allocation information of a Downlink Shared Channel (DL-SCH), transmission format and resource allocation information of an Uplink Shared Channel (UL-SCH), paging information on a Paging Channel (PCH), system information on the DL-SCH, resource allocation of a higher layer control message such as a Random Access Response (RAR) transmitted on the PDSCH, a set of transmit (Tx) power control commands for individual UEs within a UE group, a Tx power control command, information indicating activation of Voice over IP (VoIP), etc. A plurality of PDCCHs may be transmitted within the control region. The UE may monitor the plurality of PDCCHs. The PDCCHs are transmitted on an aggregation of one or several consecutive control channel elements (CCEs). The CCE is a logical allocation unit used to provide the PDCCHs with a coding rate based on the state of a radio channel. The CCE corresponds to a plurality of resource element groups (REGs). The format of the PDCCH and the number of PDCCH bits are determined based on the number of CCEs. The base station determines a PDCCH format in accordance with DCI to be transmitted to the UE, and attaches a Cyclic Redundancy Check (CRC) to the control information. The CRC is masked with an identifier (e.g., Radio Network Temporary Identifier (RNTI)) in accordance with an owner or usage of the PDCCH. For example, if the PDCCH is for a specific UE, an identifier (e.g., cell-RNTI (C-RNTI)) of the corresponding UE may be masked to the CRC. If the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. If the PDCCH is for a random access response, a random access-RNTI (RA-RNTI) may be masked to the CRC.

Figure 6:
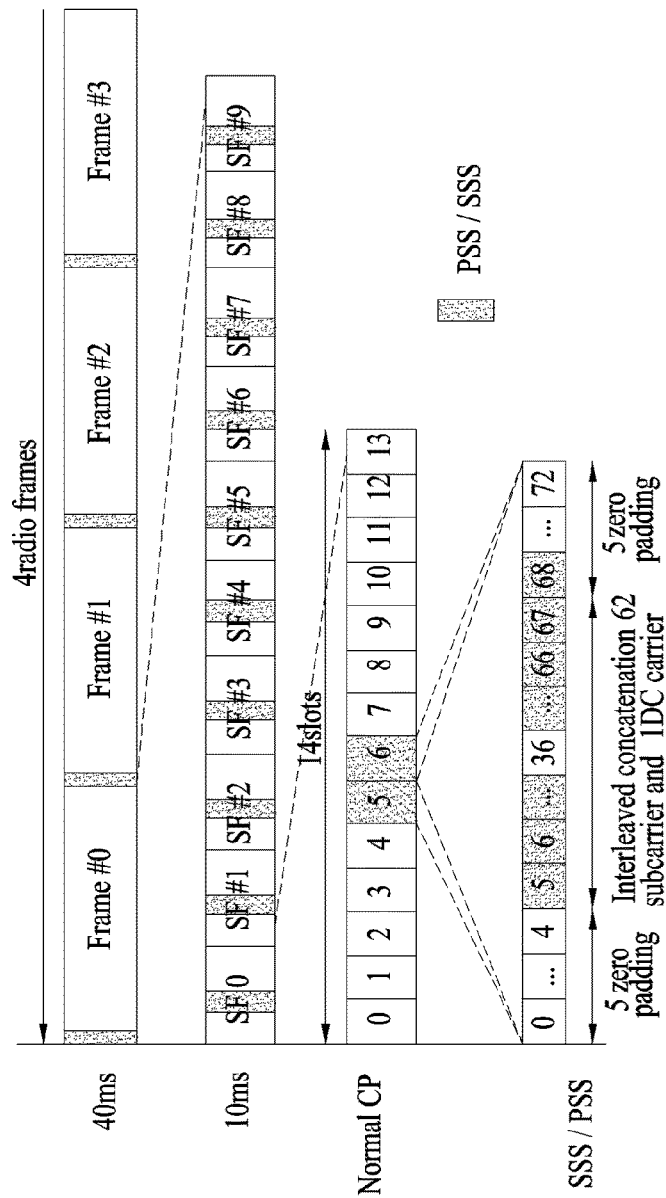
FIG. 6 is a diagram illustrating a method for transmitting a PSS/SSS in a frame structure of a 3GPP LTE system.

FIG. 6 is a diagram illustrating a method for transmitting a PSS/SSS in a frame structure of a 3GPP LTE system.

The 3GPP LTE system periodically transmits a primary synchronization signal (PSS) and a secondary synchronization signal (SSS) for downlink synchronization. In case of LTE FDD, the same PSS/SSS is repeatedly transmitted twice through the last two symbols of the first slot of the #0th and #5th subframes (6 RBs, 72 subcarriers). The PBCH is transmitted through symbols #0, 1, 2 and 3 of the second slot of the #0th subframe.

Figure 7:
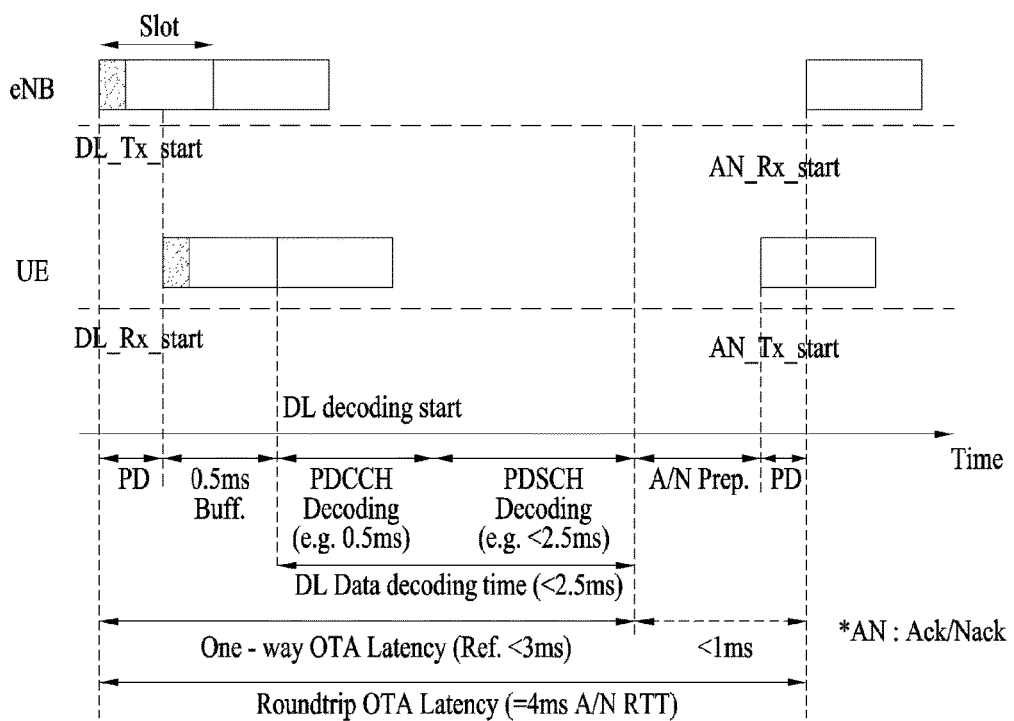
FIG. 7 is a diagram illustrating a Round Trip Time (over the air latency) in an LTE system.

FIG. 7 is a diagram illustrating a Round Trip Time (over the air latency) in an LTE system.

A reference of wireless transmission and reception latency may be illustrated as shown in FIG. 7 in view of downlink transmission and reception of the 3GPP LTE system having a subframe of 1 ms. As shown in FIG. 7, latency in reaching ACK/NACK reception with respect to unidirectional data transmission is generally 4 ms.

As described above, the future 5G technology requires data transmission of lower latency due to the advent of a new application such as real-time control and tactile internet, and it is expected that 5G data request latency will be lowered to reach 1 ms. The 5G system aims to provide data latency reduced as much as about 10 times as compared with the related art. In order to solve the problem, it is expected that a communication system of a new frame structure having a shorter TTI (e.g., 0.2 ms) will be suggested in the 5G system.

Also, it is expected that applications having various requirements such as low latency, high capacity, low energy consumption, low cost, and high user data rate will coexist in the 5G system. In this way, the 5G system needs to evolve into a system of a structure different from that of the related art to support various types of applications including application which needs ultra low latency and application which needs high data rate. In order to minimize data reception latency of the UE, it is required that a new frame structure different from that of the related art should be defined, and an influence of the legacy UE due to the new frame structure should be minimized.

5G communication evolves into a system for providing various types of applications including application which needs ultra low latency and application which needs high data rate. The technology of the present invention suggests that a system in which one or more frame structures coexist within the same band should be designed to provide users with various services having different requirements. That is, according to the technology of the present invention, a frame structure per subband (or subband group) is designed such that one or more service-specific subbands (or sub-band groups) may be defined in a random cell. As an example, the legacy 1 ms TTI frame structure for general data transmission and short TTI frame structure for data transmission that needs low latency may be configured within one band.

Hereinafter, in a frame structure which will be suggested in FIGS. 8 to 11, a length of a short frame is the same as a subframe length in the legacy LTE system. The short frame structure may further include an sPDSCH and/or an sPDCCH for a UE which needs low latency service or application in the legacy frame structure (sPDCCH is omitted in FIG. 8). Also, a length of a short subframe may be defined as three OFDM symbol durations in the case that the PDCCH reserves two symbol durations in the short frame, and may be defined as another number of OFDM symbol durations not three OFDM symbol durations in the case that the PDCCH reserves another number of symbol durations not two symbol durations. Particularly, in the short frame, the last short subframe may be defined as another number of OFDM symbol durations not three OFDM symbol durations. In the short frame structure, the short subframe may be referred to as TTI. The sPDCCH and the sPDSCH may be transmitted by OFDM with a physical downlink shared channel (PDSCH) in a system bandwidth.

Figure 8:
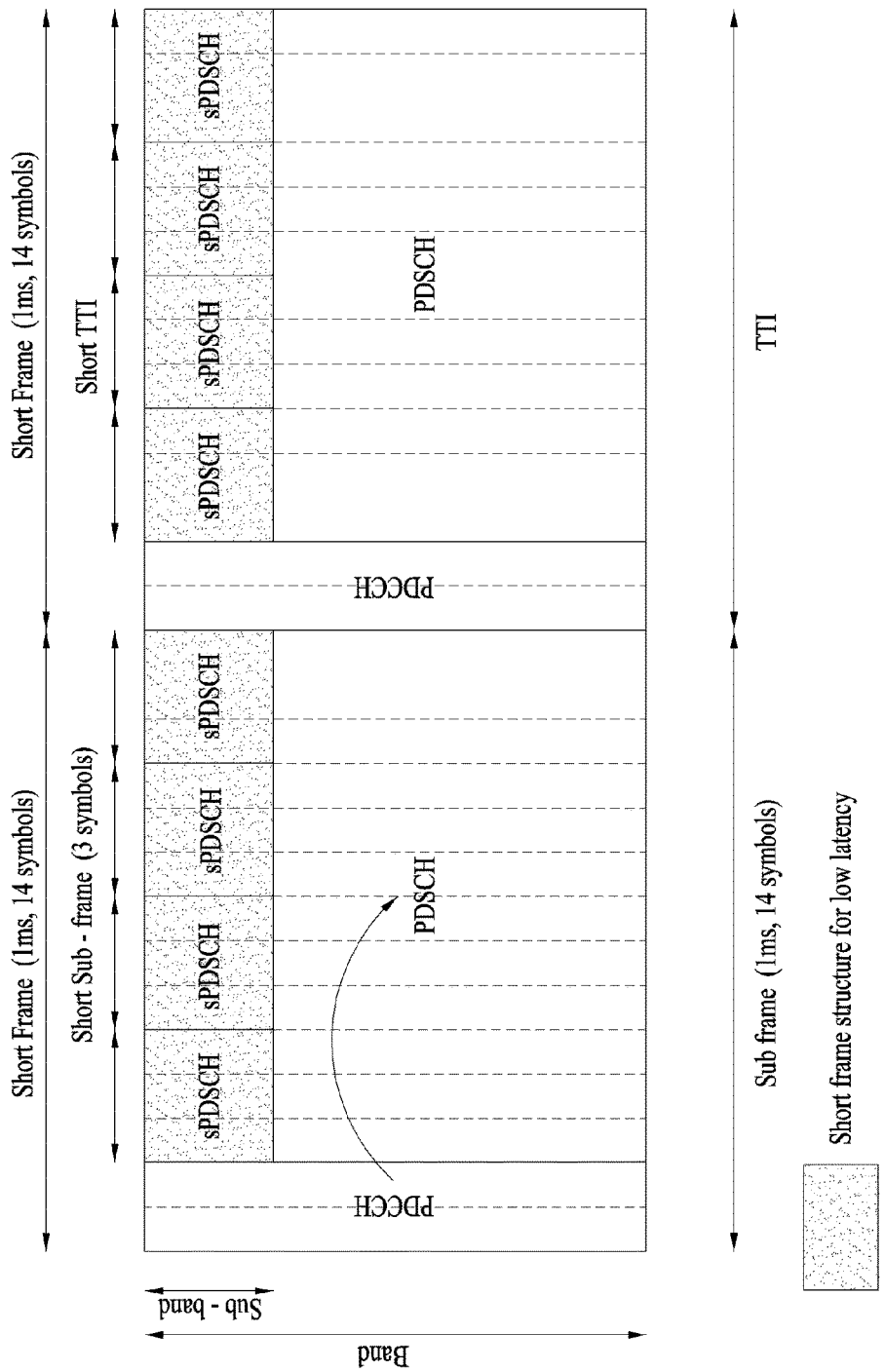
FIG. 8 is a diagram illustrating a case of a downlink with respect to a subband-wise 2-level frame structure that may be provided for a random UE within a random cell.

FIG. 8 is a diagram illustrating a case of a downlink with respect to a subband-wise 2-level frame structure that may be provided for a random UE within a random cell.

A subband-wise 2-level frame structure is shown in FIG. 8 when it is assumed that a PDCCH reserves two symbols (symbol 0, symbol 1) every subframe. As shown in FIG. 8, the PDCCH may be transmitted through a full band of two symbols (symbol 0, symbol 1) of every subframe, and a physical downlink shared channel (PDSCH) used for general data transmission in a frequency domain except a subband for low latency may be allocated from the other symbols 2 to 13. In this case, the present invention suggests that a sub-band for low latency should newly be defined in the legacy PDSCH domain. As an example, the subband for low latency in one subframe of 1 ms may include four short subframes. The subband for low latency is operated in a short sub-frame structure.

For operation in the short sub-frame structure, the base station may notify the corresponding UE that a mode operated in the short sub-frame structure is enabled or configured, through RRC (Radio Resource Control) signaling. Also, information indicating that the PDCCH reserves two symbols as shown in FIG. 8 may be indicated by PCFICH included in the PDCCH domain (in this case, PCFICH may be located at the first OFDM symbol) or may be notified from the base station to the UE through RRC signaling when it is notified that the mode operated in the short sub-frame structure is enabled or configured. The above description related to the number of PDCCH symbols is applied to even FIGS. 9 to 11.

The base station may transmit downlink scheduling information on downlink data transmitted within a short TTI (for example, short PDSCH) (hereinafter, short PDSCH may be referred to as sPDSCH) of n symbols (3 symbols in FIG. 8) to the UE through the PDCCH, or may transmit the downlink scheduling information to the UE through a short PDCCH (hereinafter, referred to as sPDCCH) newly designed within the short TTI although not shown in FIG. 8. The UE may receive the sPDSCH on the basis of the scheduling information of the PDCCH after receiving and decoding the PDCCH. The PDCCH may include scheduling information on the sPDCH for the UE which needs low latency service. The subband for low latency suggested in FIG. 8 may include 6 RBs as an example. The base station may transmit information (for example, the number of RBs (for example, 6 RBs)) on an area to which the subband is transmitted, to the corresponding UE through higher layer signaling (for example, RRC signaling). The UE may receive the sPDSCH on the basis of the information on the area to which the subband is transmitted and the information included in the PDCCH.

Figure 9:
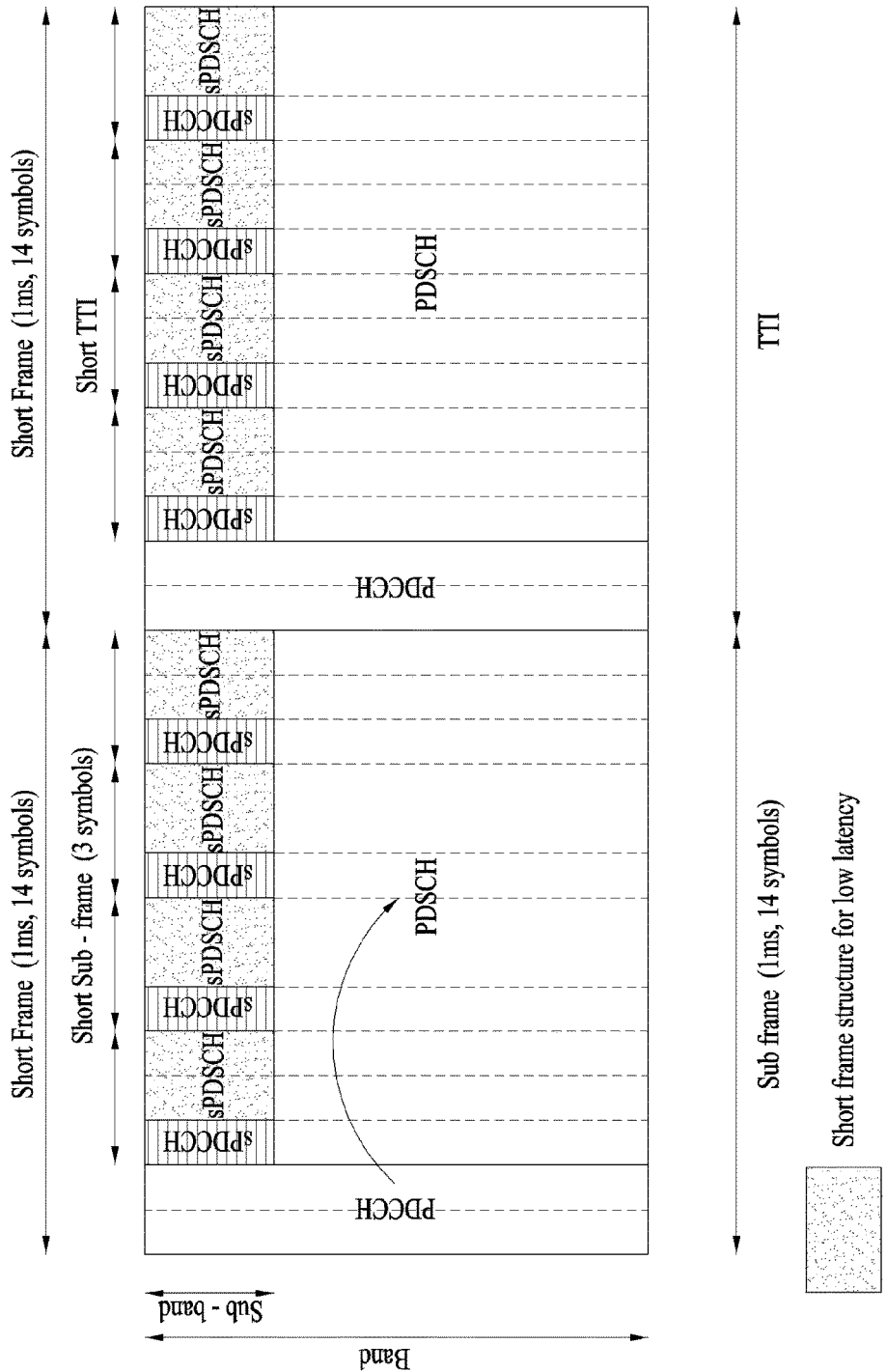
FIG. 9 is a diagram illustrating an example of a short frame structure newly suggested to support backward compatibility while providing a low latency request data transmission service according to the present invention.

FIG. 9 is a diagram illustrating an example of a short frame structure newly suggested to support backward compatibility while providing a low latency request data transmission service according to the present invention.

In the same manner as FIG. 8, for operation in the short sub-frame structure in FIG. 9, the base station may notify the corresponding UE that a mode operated in the short sub-frame structure is enabled or configured, through RRC (Radio Resource Control) signaling. Unlike FIG. 8, sPDCCH which is newly suggested is included in FIG. 9.

Generally, a control channel (for example, PDCCH) is configured to be transmitted to a system bandwidth to acquire frequency diversity. Also, since a common control channel is transmitted as the control channel, the control channel intended for broadcasting to the UEs should be defined in view of the system, whereby all UEs can receive the corresponding information. Therefore, the method suggested in FIG. 9 may be restricted that 6 RBs (1.4 MHz) are used as a transmission bandwidth of sPDCCH due to the above reasons. Also, the number of OFDM symbols to which the sPDCCH is transmitted may be limited to 1, for example. This is because that UEs configured to receive a short TTI should receive the corresponding sPDCCH without ambiguity, and DL/UL grant may be transmitted sufficiently even with the sPDCCH, which includes one OFDM symbol, as the sPDSCH may be comprised of a small number of symbols.

Also, since most of physical channels corresponding to the case that a system bandwidth defined in the legacy 3GPP LTE/LTE-A is 1.4 MHz may be reused, implementation complexity of the UE may be lowered. If a transmission bandwidth of sPDCCH and the number of transmission symbols are defined as system parameters as above, signaling for indicating the number of OFDM symbols to which the sPDCCH is transmitted is not required, whereby resource overhead according to unnecessary signaling may be reduced.

FIG. 9 illustrates an example corresponding to the case that a subband to which a short TTI will be transmitted is transmitted by being fixed to 6 RBs (sub-band size=6 RBs). The base station may transmit information (for example, the number of RBs, (for example, 6 RBs)) on an area to which the subband is transmitted, to the corresponding UE through higher layer signaling (for example, RRC signaling). The UE first receives and decodes PDCCH, and also receives and decodes sPDCCH. At this time, the UE may receive PDSCH for general data transmission on the basis of the information included in the PDCCH, and may receive sPDSCH for data transmission of data or application of a service, which requires low latency, on the basis of the information on the area to which the subband is transmitted and the information included in the sPDCCH. If the subband to which the short TTI will be transmitted is 6 RBs or more, the short TTI may be transmitted as shown in FIG. 10.

Figure 10:
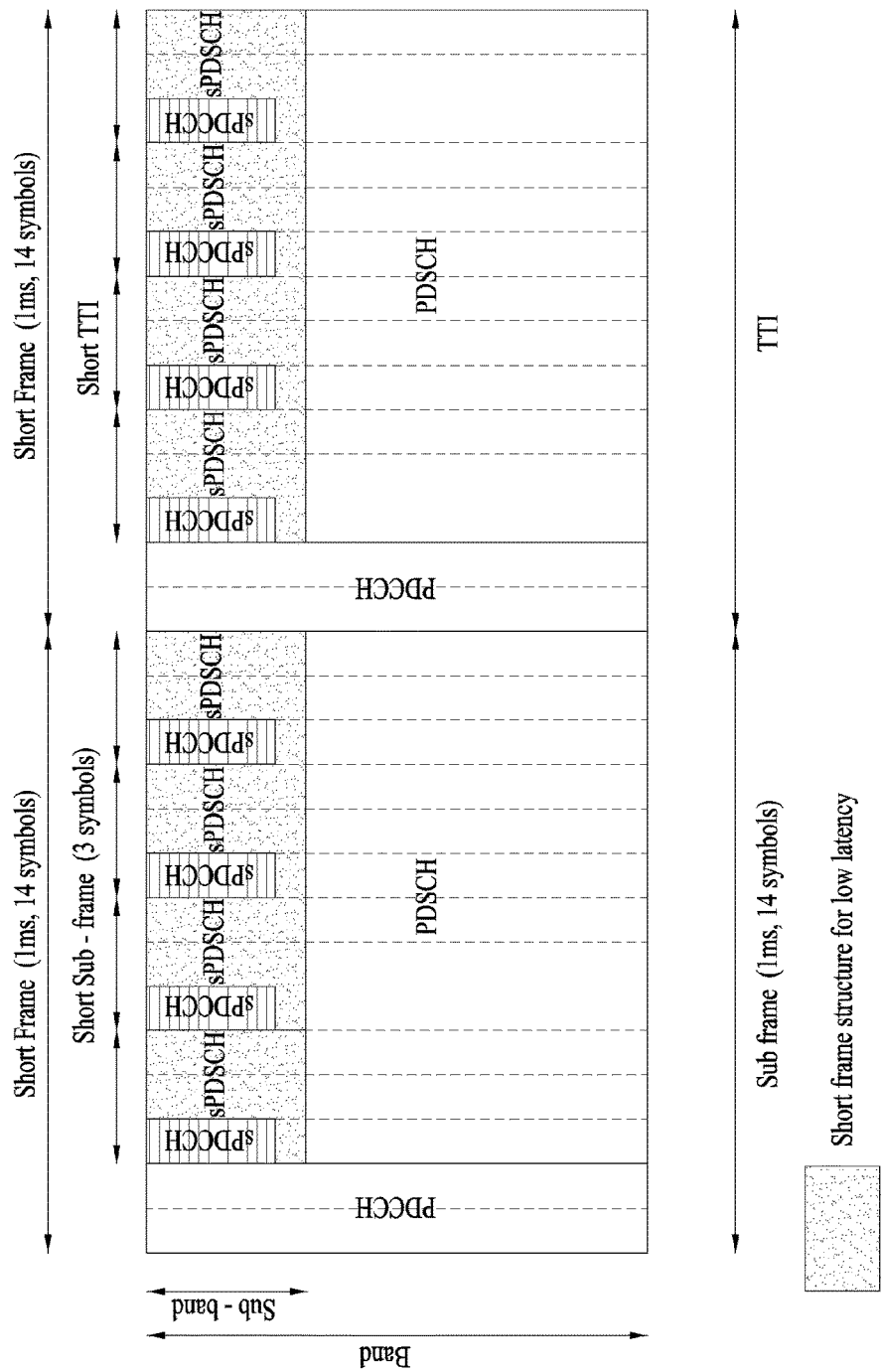
FIG. 10 is a diagram illustrating a frame structure when a subband to which a short TTI will be transmitted is 6 RBs or more in a short frame structure newly suggested to support backward compatibility while providing a low latency request data transmission service.

FIG. 10 is a diagram illustrating a frame structure when a subband to which a short TTI will be transmitted is 6 RBs or more in a short frame structure newly suggested to support backward compatibility while providing a low latency request data transmission service.

FIG. 10 illustrates that the subband to which the short TTI will be transmitted is 6 RBs or more. Likewise, the area to which the subband is transmitted may be defined through higher layer signaling (for example, RRC signaling). The sPDCCH may be transmitted through 0 to 5 RBs only. However, in this case, a starting point of the sPDSCH may be different in the area to which the sPDCCH is transmitted. Therefore, in the suggested method, a method for solving ambiguity of a data starting porting (that is, sPDSCH starting point (for example, sPDSCH start symbol index information)) is suggested. Of course, in FIG. 10, it is assumed that sPDCCH reserves one OFDM symbol.

In the suggested method, an SPDSCH starting point at a short subframe is different based on a physical resource block (PRB) inex, and if a size of a subband defined by the short subframe is greater than 6 RBs, sPDSCH starting point of PRB indexes 0 to 5 (it is assumed that PRB index is indexed downwardly on a frequency axis, that is, subband axis) is defined as the second OFDM symbol within the short subframe. However, if the PRB index is 6 RBs or more, the sPDSCH starting point may be defined as the first OFDM symbol within the short subframe. Therefore, at this time, the PDSCH may be transmitted at a different rate in accordance with PRB index through rate matching. The base station may transmit information (for exmaple, sPDSCH start symbol index information, etc.) on the sPDSCH starting port to the corresponding UE through higher layer signaling (for example, RRC signaling).

Figure 11:
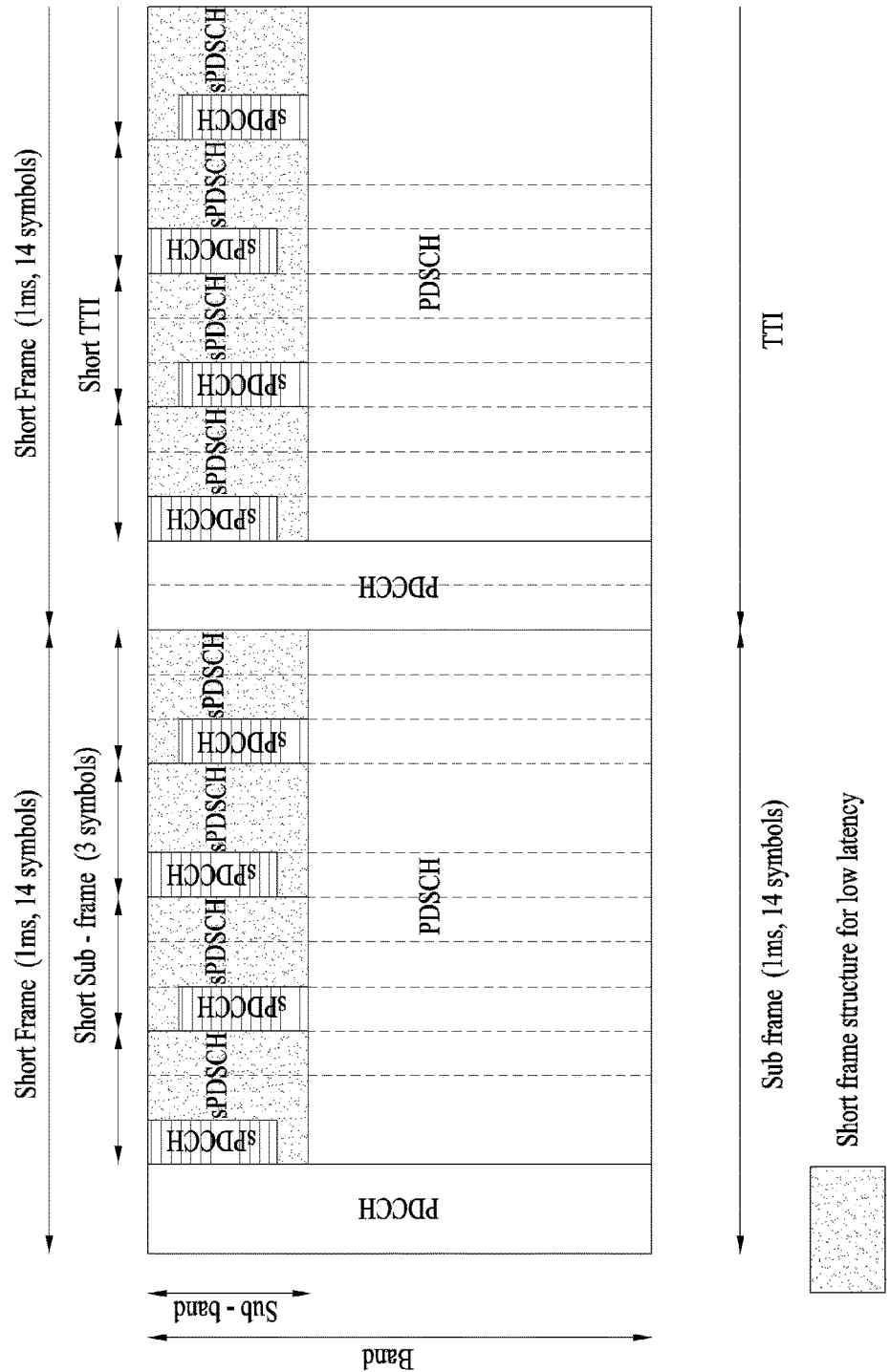
FIG. 11 is a diagram illustrating a frame structure suggested to allow an sPDCCH to acquire frequency diversity when a subband to which a short TTI will be transmitted is 6 RBs or more, as a short frame structure newly suggested to support backward compatibility while providing a low latency request data transmission service.

FIG. 11 is a diagram illustrating a frame structure suggested to allow an sPDCCH to acquire frequency diversity when a subband to which a short TTI will be transmitted is 6 RBs or more, as a short frame structure newly suggested to support backward compatibility while providing a low latency request data transmission service.

As shown in FIG. 11, if the subband to which the short TTI will be transmitted is 6 RBs or more, frequency hopping may be applied such that the corresponding sPDCCH may acquire frequency diversity. Also, a period of frequency hopping may be set in a unit of 1 ms for compatibility with the legacy frame.

If frequency hopping is performed for frequency diversity of the sPDCCH, starting point subcarrier of the sPDCCH of the short subframe is determined through the following Equation 2. When four short subframes are configured within one subframe, a subcarrier starting point of the sPDCCH of the first short subframe is defined as p(0), a subcarrier starting point of the sPDCCH of the second short subframe is defined as p(1), a subcarrier starting point of the sPDCCH of the third short subframe is defined as p(2), a subcarrier starting point of the sPDCCH of the fourth short subframe is defined as p(3), $N_{sRB}^{sDL}$ is defined as a total number of resource blocks constituting the short subframe, and $N_{sc}^{sRB}$ is defined as a total number of subcarriers in the corresponding RB, the following Equation may be expressed. At this time, a modulo computation may additionally be performed for a value of k using a value of $N_{sRB}^{sDL} N_{sc}^{sRB}$, whereby the position of the sPDCCH may cyclically be arranged in the subcarrier.

$p(0)$ is mapped to the sub-carrier represented by $k=\bar{k}$ $p(1)$ is mapped to the sub-carrier represented by $k= \bar{k}+\lfloor N_{sRB}^{sDL}/2 \rfloor \cdot N_{sc}^{sRB}/2$ $p(2)$ is mapped to the sub-carrier represented by $k= \bar{k}+\lfloor 2N_{sRB}^{sDL}/2 \rfloor \cdot N_{sc}^{sRB}/2$ $p(3)$ is mapped to the sub-carrier represented by $k= \bar{k}+\lfloor 3N_{sRB}^{sDL}/2 \rfloor \cdot N_{sc}^{sRB}/2$ [Equation 2]

At this time, the value of $\bar{k}$ may be configured through higher layer signaling, or may be expressed as a natural number including 0 or may be defined as $\bar{k}=(N_{sc}^{sRB}/2) \cdot (N_{ID}^{cell} \mod 2N_{sRB}^{sDL})$ for cell-wise randomization.

In the above-described embodiment of the present invention, a new frame structure for minimizing an influence of the legacy UE while supporting various kinds of applications such as high data rate and ultra low latency required in the 5G wireless communication system has been suggested. In order to minimize data reception latency of the UE in the 5G communication system in accordance with a new frame structure suggested in the present invention, an influence of the legacy UE can be minimized, whereby communication throughput can be improved significantly.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for receiving data in a UE for each service from a particular frame in a wireless communication system is industrially applicable in a wireless communication system such as 3GPP LTE/LTE-A system.

The invention claimed is:

1. A method for receiving data for each service in a specific frame by a user equipment (UE) in a wireless communication system, the method comprising:
   receiving, from a base station, a first control channel in a transmit time interval (TTI), the first control channel comprising first control information for scheduling of a first service;
   wherein a required latency of the first service is equal to or longer than a predefined latency;
   receiving, from the base station, a first data channel used for transmission of the first service in the TTI based on the first control information;

receiving, from the base station, a second control channel in the TTI, the second control channel comprising second control information for scheduling of a second service; and wherein a required latency of the second service is shorter than the predefined latency;

receiving, from the base station, a second data channel used for transmission of the second service in the TTI based on the second control information, wherein the first and second services are different types of services, and wherein the first control channel is received through a total system bandwidth configured for the UE in the TTI, and wherein the second control channel and second data channel are received through a specific subband of the total system bandwidth in the TTI.

2. The method according to claim 1, wherein the first control channel occupies two symbols in the TTI and the first data channel occupies three symbols in the TTI.

3. The method according to claim 1, wherein the second control channel occupies one symbol in the TTI, and the second data channel occupies two symbols in the TTI.

4. The method according to claim 1, wherein the predefined latency corresponds to 1 ms.

5. The method according to claim 1, wherein the first data channel and the second data channel are received by a frequency division multiplexing (FDM) scheme in the TTI.

6. A user equipment (UE) for receiving data for each service in a specific frame in a wireless communication system, the UE comprising:
 a receiver; and
 a processor,
 wherein the processor is configured to control:
  the receiver to receive, from a base station, a first control channel in a transmit time interval (TTI), the first control channel comprising first control information for scheduling of a first service;
  wherein a required latency of the first service is equal to or longer than a predefined latency;
  the receiver to receive, from the base station, a first data channel used for transmission of the first service in the TTI based on the first control information;
  the receiver to receive, from the base station, a second control channel in the TTI, the second control channel comprising second control information for scheduling of a second service; and
  wherein a required latency of the second service is shorter than the predefined latency;
  the receiver to receive, from the base station, a second data channel used for transmission of the second service in the TTI based on the second control information, and
 wherein the first and second services are different types of services, and
 wherein the first control channel is received through a total system bandwidth configured for the UE, and the second control channel and second data channel are received through a specific subband of the total system bandwidth in the TTI.

7. The UE according to claim 6, wherein the first control channel occupies two symbols in the TTI and the first data channel occupies three symbols in the TTI.

8. The UE according to claim 6, wherein the second control channel occupies one symbol in the TTI, and the second data channel occupies two symbols in the TTI.

9. The UE according to claim 6, wherein the predefined latency corresponds to 1 ms.

10. The UE according to claim 6, wherein the processor is configured to control the receiver to receive the first data channel and the second data channel by a frequency division multiplexing (FDM) scheme.

* * * * *